(12) United States Patent
Buchholz et al.

(10) Patent No.: US 11,283,276 B2
(45) Date of Patent: Mar. 22, 2022

(54) METHOD AND DEVICE FOR CHARGING AN ENERGY STORAGE DEVICE FOR USE IN A CLEANING APPLIANCE AND CLEANING APPLIANCE HAVING A DEVICE

(71) Applicant: Miele & Cie. KG, Guetersloh (DE)

(72) Inventors: Thomas Buchholz, Rheda-Wiedenbrueck (DE); Michael Agethen, Vlotho (DE)

(73) Assignee: Miele & Cie. KG, Guetersloh (DE)

( * ) Notice: Subject to any disclaimer, the term of this patent is extended or adjusted under 35 U.S.C. 154(b) by 217 days.

(21) Appl. No.: 16/157,109

(22) Filed: Oct. 11, 2018

(65) Prior Publication Data
US 2019/0109464 A1 Apr. 11, 2019

(30) Foreign Application Priority Data
Oct. 11, 2017 (DE) .................... 10 2017 123 665.1

(51) Int. Cl.
*H02J 7/00* (2006.01)
*A47L 9/28* (2006.01)
*A47L 5/00* (2006.01)

(52) U.S. Cl.
CPC ............... *H02J 7/007* (2013.01); *A47L 5/00* (2013.01); *A47L 9/28* (2013.01); *A47L 9/2873* (2013.01); *A47L 9/2884* (2013.01); *A47L 2201/022* (2013.01); *B60L 2200/40* (2013.01)

(58) Field of Classification Search
CPC .............. A47L 9/2873; A47L 9/2884; A47L 2201/022; A47L 5/00; A47L 9/28; H02J 7/007; B60L 2200/40

USPC ......................................... 307/154
See application file for complete search history.

(56) References Cited

U.S. PATENT DOCUMENTS

| | | | |
|---|---|---|---|
| 10,813,513 B2 | 10/2020 | Erkek et al. | |
| 2005/0229338 A1* | 10/2005 | Kashiwagi | E01H 1/00 15/1 |
| 2008/0133054 A1* | 6/2008 | Kim | A47L 9/2805 700/245 |
| 2012/0158915 A1* | 6/2012 | Ham | A47L 9/2868 709/219 |
| 2014/0184172 A1* | 7/2014 | Momo | G01R 31/382 320/160 |
| 2017/0071431 A1 | 3/2017 | Reed et al. | |
| 2017/0265703 A1* | 9/2017 | Park | A47L 9/28 |
| 2018/0184868 A1* | 7/2018 | Han | A47L 9/2852 |

FOREIGN PATENT DOCUMENTS

| | | |
|---|---|---|
| EP | 3185096 A1 | 6/2017 |
| EP | 3412193 A1 | 12/2018 |
| KR | 20090115526 A | 11/2009 |

* cited by examiner

*Primary Examiner* — Toan T Vu
(74) *Attorney, Agent, or Firm* — Leydig, Voit & Mayer, Ltd.

(57) ABSTRACT

A method for charging an energy storage device for use in a cleaning appliance includes the following steps: reading an energy demand signal representative of an energy required by the cleaning appliance for a predetermined cleaning run; and outputting a charging signal using the energy demand signal, the charging signal causing the energy storage device to be charged as a function of the energy required.

9 Claims, 5 Drawing Sheets

METHOD AND DEVICE FOR CHARGING AN ENERGY STORAGE DEVICE FOR USE IN A CLEANING APPLIANCE AND CLEANING APPLIANCE HAVING A DEVICE

CROSS-REFERENCE TO PRIOR APPLICATION

Priority is claimed to German Patent Application No. DE 10 2017 123 665.1, filed on Oct. 11, 2017, the entire disclosure of which is hereby incorporated by reference herein.

FIELD

The approach presented herein relates to a method and device for charging an energy storage device for use in a cleaning appliance and to a cleaning appliance having a device.

BACKGROUND

Robot vacuum cleaners are delivered with either a power supply unit or a charging station, via which the appliances are charged. Different storage battery technologies are used, of which the lithium-ion battery is today used almost exclusively, with only a few exceptions. A large number of vacuum cleaners allow scheduling of cleaning times via a timer. Both weekly timers and simpler daily timers are used. On the market, there are available first robot vacuum cleaners that create a cleaning map. Some of such cleaning maps are merely used to display the area that has been cleaned, while others allow for interaction. The known appliances and procedures either fully recharge the battery automatically via the charging station upon completion of a cleaning run, or need to be actively charged by the user via a power supply unit.

SUMMARY

In an embodiment, the present invention provides a method for charging an energy storage device for use in a cleaning appliance, the method comprising the following steps: reading an energy demand signal representative of an energy required by the cleaning appliance for a predetermined cleaning run; and outputting a charging signal using the energy demand signal, the charging signal causing the energy storage device to be charged as a function of the energy required.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

An aspect of the present invention provides an improved method and an improved device for charging an energy storage device for use in a cleaning appliance and a cleaning appliance having an improved device.

In an embodiment, the present invention provides a method for charging an energy storage device for use in a cleaning appliance, a device for charging an energy storage device for use in a cleaning appliance, and finally also a cleaning appliance having a device; the method, device and cleaning appliance having the respective features described herein. The present approach is also directed to a computer program.

The approach presented herein offers the advantage that, by using a method presented herein, capacity loss of an energy storage device is reduced, thus increasing the lifetime of the energy storage device.

A method for charging an energy storage device for use in a cleaning appliance includes a reading step and an outputting step. In the reading step, an energy demand signal is read that is representative of an energy required by the cleaning appliance for a predetermined cleaning run. In the outputting step, using the energy demand signal, a charging signal is output that causes the energy storage device to be charged as a function of the energy required.

This method may be implemented, for example, in software or hardware, or as a software and hardware hybrid, for example in a controller.

The energy storage device may be a rechargeable battery, such as, for example, a lithium-ion battery. The cleaning appliance may be a robot vacuum cleaner. If an energy storage device as presented herein is charged only to the level required for the predetermined cleaning run; i.e. one cleaning tour, then this means that the energy storage device is charged in a voltage range that produces as little stress as possible. Thus, in turn, makes it possible to extend the life expectancy of the energy storage device. The predetermined cleaning run may be an upcoming cleaning run. The charging signal may be output to an interface with a charging device for the energy storage device.

The outputting step may be terminated as soon as the energy required has been charged into the energy storage device. This makes it possible to prevent full charging of the energy storage device. Instead, the energy storage device is only charged with the amount of energy that is required for the predetermined cleaning run.

To be able to provide a certain base state of charge in the energy storage device and to prevent the energy storage device from being stored while in a minimum state of charge, the method may include a providing step in which a charging signal is provided that causes the energy storage device to be charged only to a predetermined storage charge state. The charging signal may be provided as soon as the state of charge falls below the storage charge state, for example within a tolerance range of 20%. The storage charge state may represent a state of charge of the energy storage device at which the energy storage device is charged to less than one-half or less than one-third of its capacity. The storage charge state may represent a state of charge of approximately 30% of the capacity of the energy storage device. Thus, the charging of the energy storage device can be terminated once the storage charge state has been reached, the storage charge state being unequal to the fully charged state of the energy storage device. If, for an upcoming predetermined cleaning run, the required energy is charged into the energy storage device having the storage charge state, then, by performing a predetermined cleaning run, the energy storage device is discharged to a level where it is in the storage condition again.

To be able to provide the energy demand signal, the method may include a determining step in which the energy required for the predetermined cleaning run is determined. For example, the required energy may be determined using a created cleaning route and/or a stored cleaning schedule. The cleaning route may be cleaning map, such as, for example, a stored floor plan of an area to be cleaned. The stored cleaning schedule may be a user-selected cleaning schedule, which may include, for example, cleaning tasks and/or cleaning cycles.

In the determining step, the required energy may be determined, for example, as an average energy that has previously been required for the predetermined cleaning run. However, the required energy may also be read in directly as a previously stored piece of information.

In an advantageous embodiment, in the reading step, a time signal representative of a cleaning time of the predetermined cleaning run is also read in. In this connection, the outputting step may be performed using the time signal, for example in a temporal relationship with the cleaning time. The cleaning time may be a point in time at which the predetermined cleaning run is expected to begin. The cleaning time may be read from the cleaning schedule. Advantageously, the outputting step may be executed before the cleaning time is reached so as to be able to provide the required energy before the cleaning time. Additionally or alternatively, the time signal may indicate a duration of the predetermined cleaning run, and the required energy may be determined using the duration.

If the method also includes a receiving step in which a charging time signal is received that is representative of a determined charging time for charging the required energy. In this connection, the outputting step may be performed using the charging time signal, for example in a further temporal relationship with the determined cleaning time. This may ensure that the cleaning appliance will have the required energy before the cleaning time is reached.

For example, the charging time may be provided in an ascertaining step in which the charging time is ascertained using the required energy and/or a parameter of the energy storage device.

In order to adapt charging to the specific energy storage device used, the method may include an ascertaining step in which a maximum attainable capacity and/or a currently attained state of charge of the energy storage device are/is ascertained. In the outputting step, the charging signal may be output that causes the energy storage device to be charged as a function of the maximum attainable capacity and/or the currently attained state of charge.

Furthermore, it is advantageous if the method includes a storing step in which a further cleaning time and/or cleaning route representative of the predetermined cleaning run are/is stored in a cleaning schedule, the further cleaning time and/or cleaning route being representative of a repeated, manually employed use of the cleaning appliance. This may ensure that at times at which the cleaning appliance is frequently used upon manual initiation, a corresponding energy required for this can be provided using the presented method.

The approach presented herein also provides a device that is adapted for performing, controlling and implementing the steps of a variant of a method presented herein in corresponding units. The object underlying the present approach may also be achieved rapidly and efficiently by this embodiment variant of the approach in the form of a device.

To this end, the device may feature at least one processing unit for processing signals or data, at least one memory unit for storing signals or data, at least one interface to a sensor or an actuator for reading sensor signals from the sensor or for outputting data signals or control signals to the actuator and/or at least one communication interface for reading in or outputting data that is embedded in a communication protocol. The processing unit may be, for example, a signal processor, a microcontroller or the like, and the storage unit may be a flash memory, an EPROM or a magnetic storage unit. The communication interface may be adapted for reading in or outputting data wirelessly and/or by wire. A communication interface that is capable of reading in or outputting data by wire may read in data from a corresponding data transmission line or output data into a corresponding data transmission line electrically or optically, for example.

In the present context, a device may be understood to be an electrical device that processes sensor signals and outputs control and/or data signals as a function thereof. The device may have an interface which may be implemented in hardware and/or software. When implemented in hardware, the interfaces may, for example, be part of what is known as a system ASIC that includes a wide variety of device functions. However, the interfaces may also be separate, integrated circuits or be at least partly composed of discrete components. When implemented in software, the interfaces may be software modules that are present, for example, on a microcontroller in addition to other software modules.

In an advantageous embodiment, the device controls a charging signal. To this end, the device may, for example, access a sensor signal, such as an energy demand signal. The control takes place via actuators, such as a read-in device for reading the energy demand signal and an output device for outputting the charging signal.

A cleaning appliance, in particular a robot vacuum cleaner, possesses the presented device. A cleaning appliance as presented herein may be used as a replacement for known cleaning appliances, the presented cleaning appliance advantageously realizing the advantages of the device, thus increasing the lifetime of an energy storage device of the cleaning appliance.

Also advantageous is a computer program product or computer program having program code, which may be stored on a machine-readable carrier or storage medium, such as a semiconductor memory, a hard-disk memory or an optical memory, and is used to carry out, implement and/or control the steps of the method in accordance with any of the afore described embodiments, particularly when the program product or program is executed on a computer or a device.

In the following description of advantageous exemplary embodiments of the present approach, functionally similar elements shown in the various figures are denoted by the same or similar reference numerals, and the description thereof is not repeated.

Figure 1:
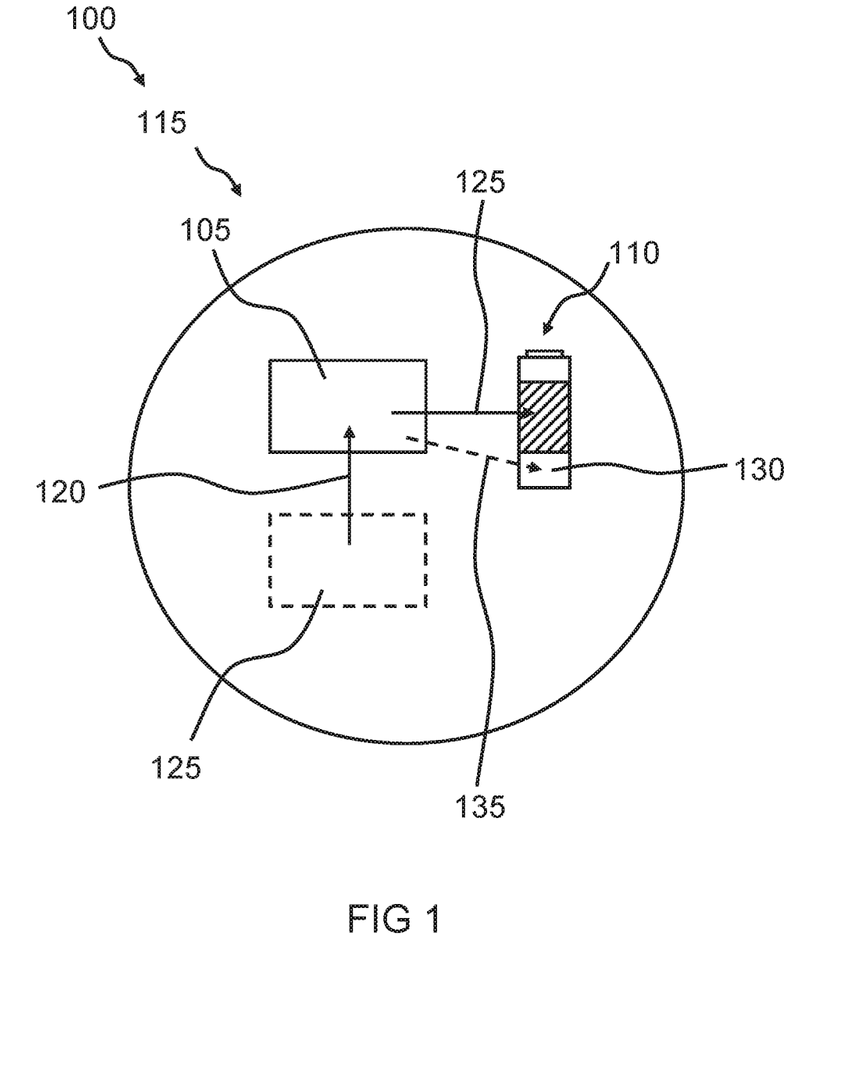
FIG. 1 is a schematic view of a cleaning appliance having a device for charging an energy storage device according to an exemplary embodiment.

FIG. 1 shows, in schematic form, a cleaning appliance 100 having a device 105 for charging an energy storage device 110 according to an exemplary embodiment. In accordance with various exemplary embodiments, device 105 is part of cleaning appliance 100 or part of a charging device disposed external to cleaning appliance 100 and used for charging energy storage device 110 of cleaning appliance 100.

In accordance with this exemplary embodiment, energy storage device 110 and device 105 are accommodated in or on cleaning appliance 100, which, in this exemplary embodiment, takes the form of a robot vacuum cleaner 115.

Device 105 is adapted to cause charging of energy storage device 110 of robot vacuum cleaner 115. To this end, device 105 is adapted to read an energy demand signal 120 representative of an energy required by robot vacuum cleaner 115 for a predetermined cleaning run. The predetermined cleaning run may be an upcoming cleaning run. The required energy may be calculated such that it is completely used in the course of the predetermined cleaning run. Device 105 is further adapted to output a charging signal 125 that causes energy storage device 110 to be charged as a function of the energy required. Charging signal 125 may cause energy storage device 110 to be charged until the required energy has been charged into energy storage device 110 in addition to an energy already present in energy storage device 110. Once the required energy has been charged into energy storage device 110, the outputting of charging signal 125, and thus the further charging of energy storage device 110, can be terminated.

In accordance with this exemplary embodiment, device 105 is adapted to determine the required energy using a created cleaning route 125 and/or a stored cleaning schedule. To this end, cleaning route 125 and/or the stored cleaning schedule may be present as digital data.

In the following, optional exemplary embodiments will be described again in other words with reference to FIG. 1.

Robot vacuum cleaners, such as the robot vacuum cleaner 115 shown here, and many battery-powered products mainly use lithium-ion batteries as the energy storage device 110, also referred to in short as "batteries" hereinafter, for power supply purposes. Aging and capacity loss of these batteries are, in part, limiting factors for lifetime or lead to an expensive purchase of a replacement battery.

The lifetime and capacitance loss of a lithium-ion battery are mainly governed by two decisive parameters: firstly, calendric aging, and secondly, the number and type (charging current, voltage range) of charging cycles. Storage of a battery for one year results in a capacity loss similar to that caused by 100 charging cycles. Both parameters can be positively influenced by information from the utilization of the robot vacuum cleaner, thus significantly increasing the lifetime of a battery and reducing the capacitance loss.

To achieve low capacity loss, it is advantageous for lithium-ion batteries to be stored in a state of charge (SOC) of about 30% to minimize calendric aging. In order to minimize the calendric aging caused by charging and discharging, it is further advantageous to use only a portion and not the maximum and minimum voltage ranges of the batteries or battery cells of the battery.

Robot vacuum cleaners may be provided with a charging station that causes the battery to be fully charged upon completion of a cleaning tour. This means that the voltage range of the battery is fully utilized and the battery is, as it were, stored at 100% SOC.

In contrast, the energy storage device 110 of the robot vacuum cleaner 115 presented herein is charged by device 105 to a predetermined storage charge state 130 which, in this exemplary embodiment, is only 30% SOC, unless a predetermined cleaning run requiring a higher state of charge of energy storage device 110 is imminent. For this purpose, device 105 is adapted to output a charging signal 135 that causes energy storage device 110 to be charged to the predetermined storage charge state 130 once the state of charge falls below storage charge state 130. In accordance with this exemplary embodiment, predetermined storage charge state 130 represents 30% of the capacity of energy storage device 110.

Since this condition covers a major portion of the lifetime of the appliance, this low storage charge state 130 is optimal for the durability of the battery.

Using information about the energy required for an average cleaning run and a cleaning start time obtained from a cleaning map in the form of cleaning route 125 and/or from the cleaning schedule stored by the user, the battery can be stored in its optimal ranges, and charging signal 125 can store into the battery only the energy that is required for one cleaning operation.

Thus, in accordance with an exemplary embodiment, device 105 implements a charging strategy based on information from the use of robot vacuum cleaner 115 about the average required energy, as well as the cleaning schedule and the charging process.

This eliminates the need for energy storage device 110 to be fully recharged after a cleaning run via the charging station or actively by the user via a power supply unit. As compared to storing the battery at only about 30% SOC, as advantageously enabled by device 105, storing the battery at 100% SOC would significantly add to the calendric aging thereof.

An example follows below: If robot vacuum cleaner 115 moves around for one hour every day and the charging time required for this is two hours, then this means that without the approach described herein, storage at 100% SOC is 21 hours per day and thus nearly 90% of the lifetime.

As described earlier, the batteries of appliances are frequently charged to their maximum defined charge voltage. Operation of a lithium-ion battery within the upper defined voltage range or up to the end-of-charge voltage, in particular, has a negative effect on the capacity thereof.

The device 105 presented herein now makes it possible for the appliance battery in the form of energy storage device 110 to be charged only within a voltage range that produces as little stress as possible. In addition, only the energy required for one cleaning operation or cleaning run is stored into energy storage device 110.

Overall, therefore, by optimizing these parameters, the capacity loss of energy storage device 110 is reduced, thus increasing the lifetime of the battery.

In summary, this means that by using information about the energy required for one cleaning run and the cleaning start times scheduled by the user, the battery is stored in optimal voltage ranges and only the energy required for one cleaning run is stored into the battery. The information originates from customer- or application-specific robot data of robot vacuum cleaner 115.

Specifically, this means: In this exemplary embodiment, device 105 determines the relevant start time for the appliance from the times programmed by the user into a timer. In accordance with this exemplary embodiment, energy storage device 110 of robot vacuum cleaner 115 is charged to the required SOC no earlier than at a time matched to the start of robot vacuum cleaner 115. The energy required for the cleaning operation is determined by the robot itself from previous cleanups.

An example follows below: Robot vacuum cleaner 115 starts at 9:00 a.m. every morning in accordance with the cleaning schedule of the user and requires 50% of the battery capacity. Robot vacuum cleaner 115 takes two hours to charge this amount of energy. From 7:00 a.m. to 9:00 a.m., robot vacuum cleaner 115 is charged from 30% to 80% SOC. After that, robot vacuum cleaner 115 makes its cleaning tour, during which the 80% SOC is discharged to 30% SOC, and energy storage device 110 remains at 30% SOC until 7 a.m. the next morning. This is a theoretical example and may be optimized for the tolerances in the real operational environment.

More sophisticated processes, such as the learning of usage patterns of the user or the determination of a likely use, may also form the basis for the charging strategy. Example: The customer vacuums under the dining table every evening after dinner between 18:00 p.m. and 20:00 p.m. upon a manual command. Device 105 is adapted to learn this behavior and modify the charging strategy according to this pattern; i.e., the energy and point in time at which charging takes place.

In accordance with an exemplary embodiment, energy storage device 110 is placed into a battery care mode while in the storage charge state 130.

Another example follows below: A typical end-of-charge voltage of a lithium-ion battery cell is 4.2 V. If this battery cell is operated only up to 4.1 V, then the number of charging cycles until a capacitance loss of 20% (80% state of health) is reached is doubled. If the voltage range used is reduced by another 0.1 V, then the cycling stability is doubled once again. Overall, therefore, the method that can be performed or controlled by device 105 makes it possible to multiply the number of charging cycles possible until a critical loss of capacity. This increases the lifetime of products and of the battery of robot vacuum cleaner 115, respectively.

In accordance with an alternative exemplary embodiment, robot vacuum cleaner 115 is configured as another home robot or as a battery-powered vacuum cleaner or as a handstick or as a handheld.

Figure 2:
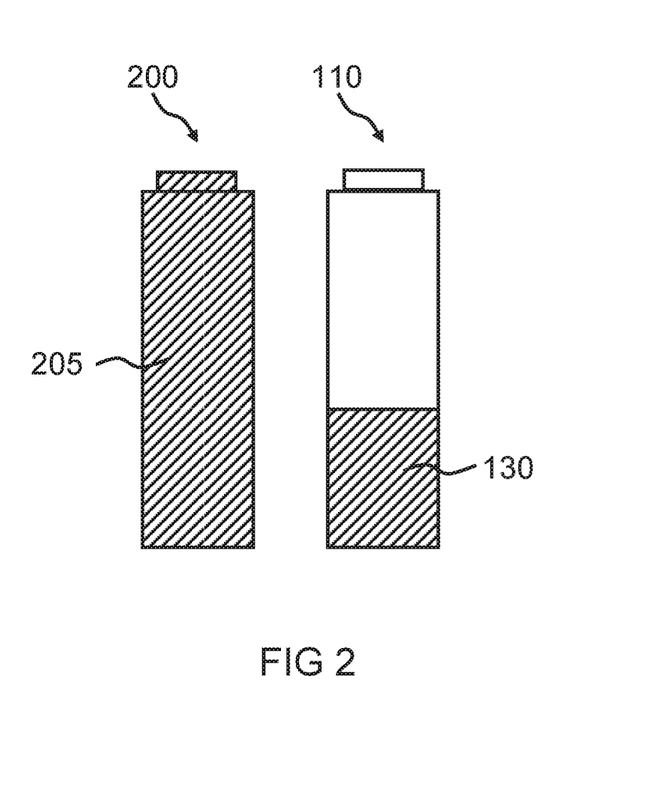
FIGS. 2 through 3 are schematic cross-sectional views of an energy storage device according to an exemplary embodiment.

FIG. 2 shows, in schematic cross-sectional view, an energy storage device 110 according to an exemplary embodiment. Energy storage device 110 may be the one described in FIG. 1, in which a storage charge state 130 of 30% was brought about by the device described in FIG. 1.

For comparison purposes, an energy storage device 200 is depicted to the left of energy storage device 110. Energy storage device 200 has a state of charge 205 of 100% SOC, which, unlike the approach presented herein, results in rapid aging thereof.

Figure 3:
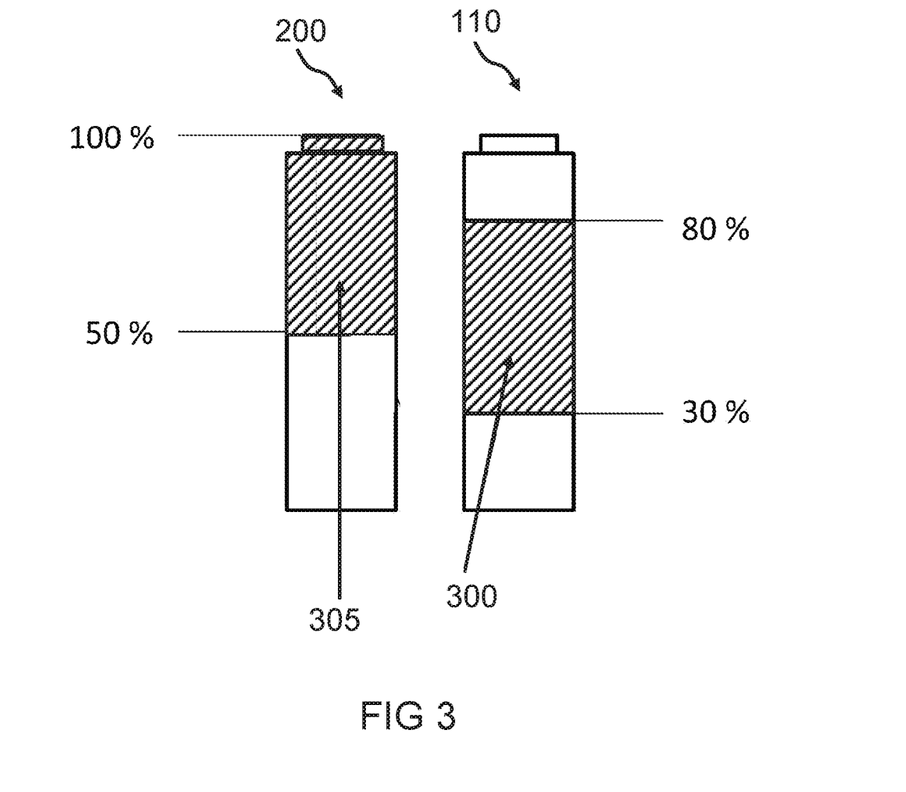

FIG. 3 shows, in schematic cross-sectional view, an energy storage device 110 according to an exemplary embodiment. Energy storage device 110 may be the one shown in FIG. 1, which is charged with the required energy. The known energy storage device 200 is the known energy storage device 200 depicted in FIG. 2.

In the case of energy storage device 110, advantageously, a middle voltage range 300 of energy storage device 110 is used for a cleaning run. In contrast, in the case of the energy storage device 200 shown on the left, a maximum voltage range 305 of energy storage device 200 is used in the course of a cleaning run.

Figure 4:
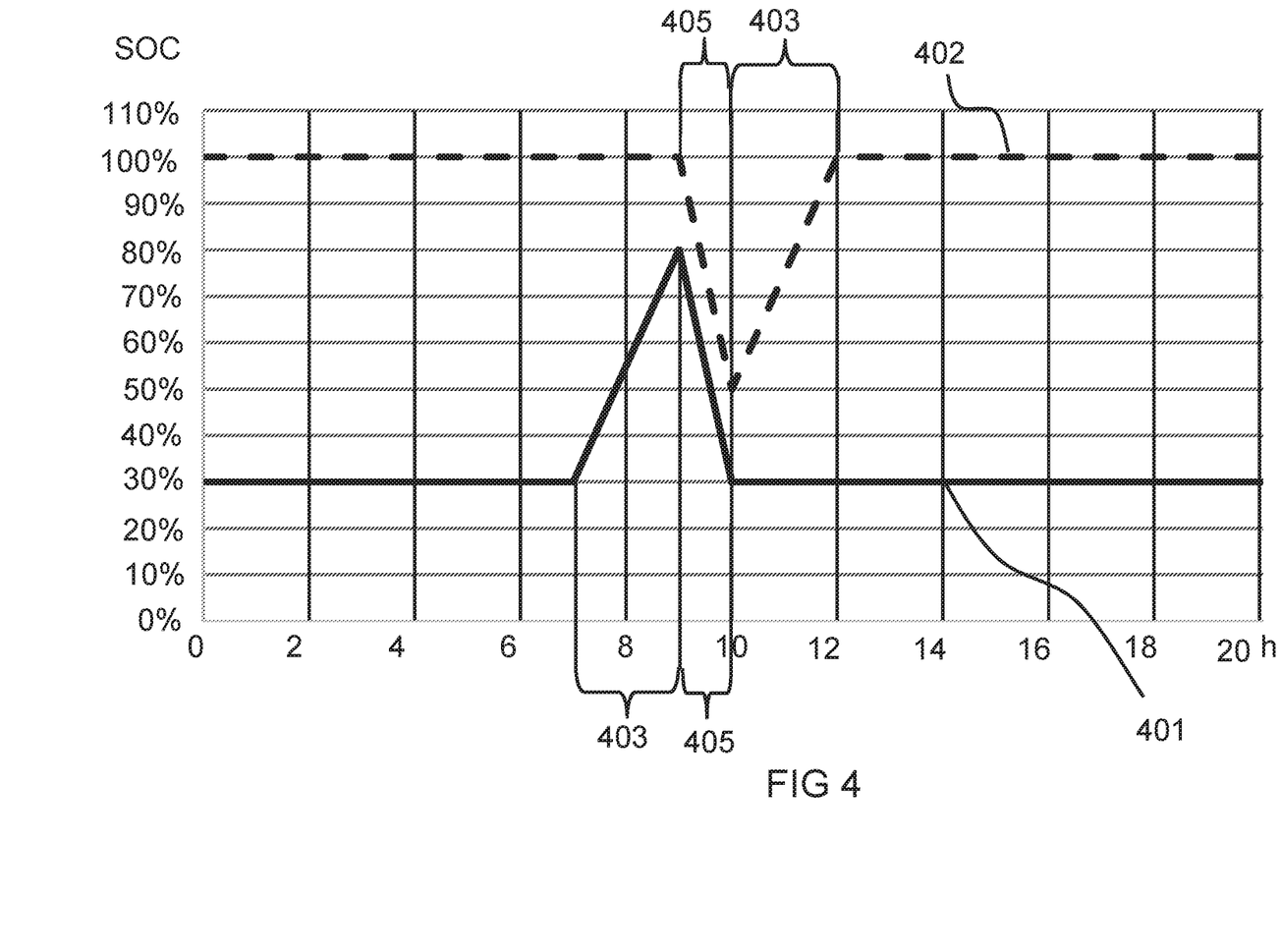
FIG. 4 is a diagram showing states of charge of an energy storage device over time according to an exemplary embodiment.

FIG. 4 shows a diagram illustrating states of charge SOC of an energy storage device over time h according to an exemplary embodiment. The energy storage device may be the one described with reference to any of the previous figures.

The states of charge SOC of the energy storage device are indicated by a solid line 401. Other states of charge of an alternative energy storage device that is operated without the approach described herein are indicated by a dashed line 402. The diagram compares states of charge SOC during a charging process 403 of the energy storage device and during an operation 405 of the cleaning appliance, during which the energy storage device is being discharged.

As can be seen from line 401, the energy storage device is maintained in the storage charge state, here 30% by way of example, as long as no cleaning run is imminent. In accordance with this exemplary embodiment, the cleaning run starts at 9:00 a.m. and ends at 10:00 a.m. During the remainder of the day, no cleaning run takes place. In accordance with an exemplary embodiment, the point in time at which the cleaning run begins is a known cleaning time, which is used to charge the energy storage device with the energy required for the cleaning run in time before the cleaning run begins. In accordance with an exemplary embodiment, charging process 403 is started such that it is completed exactly or in a predetermined time interval before the beginning of the cleaning run. The predetermined time interval may, for example, be less than one hour. In accordance with the approach described herein, the energy storage device is only charged with the energy required, starting from the storage charge state and here to 80% by way of example. Thus, the energy storage device is charged to a state of charge equal to the storage charge state plus the energy required. Advantageously, the required energy that has been added into the energy storage device during the charging process is withdrawn therefrom during the cleaning operation, so that upon completion of the cleaning operation, the energy storage device has at least approximately reached the storage charge state again. If, upon completion of the cleaning operation, the energy storage device has a state of charge different from the storage charge state, then the energy storage device is optionally charged or optionally discharged after the cleaning operation so as to reach the storage charge state.

In contrast, line 402 represents a state of charge of an energy storage device that has a storage charge state of 100%. In this case, the energy storage device is fully charged immediately upon completion of the cleaning operation.

Figure 5:
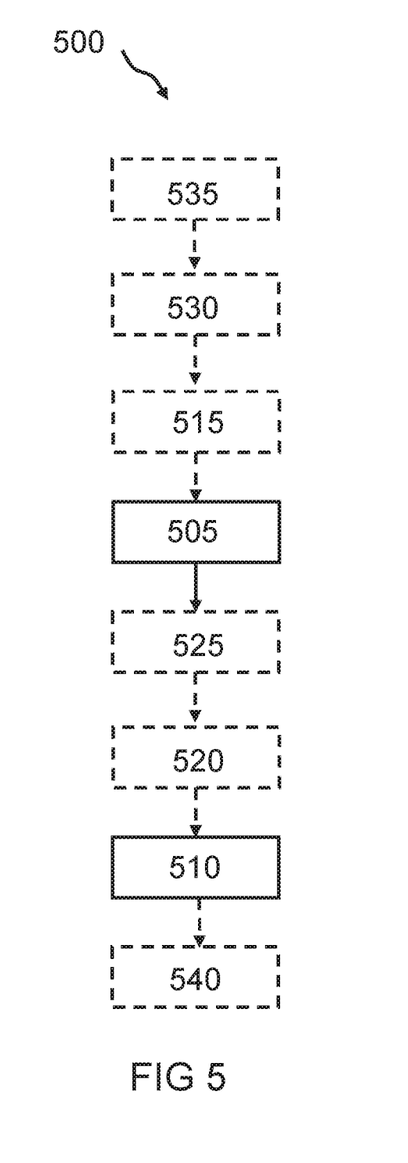
FIG. 5 is a flow chart of a method for charging an energy storage device for use in a cleaning appliance according to an exemplary embodiment.

FIG. 5 shows a flow chart of a method 500 for charging an energy storage device for use in a cleaning appliance according to an exemplary embodiment. Method 500 may be one which can be controlled or performed by the device described in FIG. 1. The method 500 presented herein may also be referred to as a method for increasing the battery lifetime of robot vacuum cleaners through cleaning scheduling.

Method 500 includes at least a reading step 505 and an outputting step 510. In reading step 505, an energy demand signal is read that is representative of an energy required by the cleaning appliance for a cleaning run. In outputting step 510, a charging signal is output that causes the energy storage device to be charged as a function of the energy required.

The exemplary embodiments and additions steps described below are optional.

In accordance with this exemplary embodiment, a time signal representative of a cleaning time of the cleaning tour is read in reading step 505, and outputting step 510 is performed in a temporal relationship with the cleaning time.

In accordance with this exemplary embodiment, method 500 further includes a determining step 515 in which the required energy is determined using a created cleaning route and/or a stored cleaning schedule.

In addition, in accordance with this exemplary embodiment, method 500 includes a receiving step 520 in which a charging time signal is received that is representative of a determined charging time for charging the required energy, and outputting step 510 is performed in a further temporal relationship with the determined charging time before the cleaning time.

In accordance with this exemplary embodiment, method 500 further includes an ascertaining step 525 in which the charging time is ascertained using the required energy and/or a parameter of the energy storage device.

Moreover, in accordance with this exemplary embodiment, method 500 includes a charging step in which a charging signal is output that causes the energy storage device to be charged to a predetermined storage charge state once the state of charge falls below the storage charge state.

In accordance with this exemplary embodiment, method 500 additionally includes a further ascertaining step 535 in which a maximum attainable capacity and/or a currently attained state of charge of the energy storage device are/is ascertained, and in outputting step 505, the charging signal is output that causes the energy storage device to be charged as a function of the maximum attainable capacity and/or the currently attained state of charge.

Finally, in accordance with this exemplary embodiment, method 500 includes a storing step 540 in which a further cleaning time and/or a further cleaning route are/is stored in a cleaning schedule.

If an exemplary embodiment includes an "AND/OR" logic operation between a first feature and a second feature, then this is to be read as the exemplary embodiment in accordance with one specific embodiment having both the first feature as well as the second feature and, in accordance with another specific embodiment, either only the first feature or only the second feature.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for charging an energy storage device for use in a cleaning appliance, the energy storage device having a state of charge (SOC), the method comprising the following steps, all of which are performed in advance of the cleaning appliance performing a predetermined cleaning run:
   determining an energy required by the cleaning appliance for the predetermined cleaning run using a created cleaning route of the cleaning appliance and/or a stored cleaning schedule of the cleaning appliance;
   reading an energy demand signal representative of the energy required by the cleaning appliance for the predetermined cleaning run; and
   outputting a charging signal using the energy demand signal, the charging signal causing the energy storage device to be charged as a function of the energy required by the cleaning appliance for the predetermined cleaning run to an SOC less than a maximum SOC of the energy storage device.

2. The method as recited in claim 1, wherein the outputting step is terminated as soon as the energy required has been charged into the energy storage device.

3. The method as recited in claim 1, wherein in the reading step, a time signal representative of a cleaning time of the predetermined cleaning run is read in, the outputting step being performed using the time signal.

4. The method as recited in claim 1, further comprising a step of receiving a charging time signal representative of a determined charging time for charging the required energy, the outputting step being performed using the charging time signal.

5. The method as recited in claim 1, further comprising a storing step in which a cleaning time and/or cleaning route representative of the predetermined cleaning run are/is stored in a cleaning schedule.

6. A device configured to control and/or perform the steps of the method according to claim 1 in corresponding units.

7. A cleaning appliance comprising the device according to claim 6.

8. A computer program product comprising program code for performing the method according to claim 1 when the computer program product is executed on a device.

9. The cleaning appliance recited in claim 7, wherein the cleaning appliance comprises a robot vacuum cleaner.

* * * * *